Figure 1:
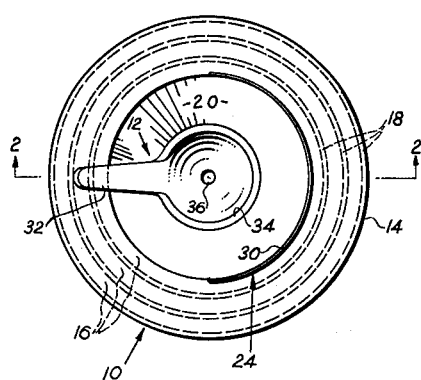

Oct. 11, 1955  F. M. DENTON  2,720,232
EGG SEPARATOR HAVING REMOVABLE YOLK SPOON
Filed May 11, 1954

INVENTOR.
FRANK M. DENTON
BY
ATTORNEY

United States Patent Office 2,720,232
Patented Oct. 11, 1955

2,720,232
EGG SEPARATOR HAVING REMOVABLE YOLK SPOON

Frank M. Denton, Brooklyn, N. Y.

Application May 11, 1954, Serial No. 428,964

3 Claims. (Cl. 146—2)

The present invention relates to an egg separating device for separating the white of an egg from the yolk.

It is well known that in the main, an egg consists of both a white and a yolk, and that the white surrounds the yolk. The yolk is contained in a thin membraneous sac which, when punctured, allows the yolk to flow therefrom. If the sac is punctured while the yolk is surrounded by the white, both the white and yolk will flow together and mix. In such a condition, separation becomes a difficult task. The function of the egg separator of the instant invention is to effect the separation of the white from about the yolk without puncturing the yolk sac.

Separator devices of the prior art with which the present invention is concerned, attempt to separate the white from the yolk by shearing or cutting away the white from about the thin protective yolk sac. In many instances, if the yolk is larger than one normally accommodated by the device, the yolk sac is subjected to the shearing, separating action of the device and is punctured. The yolk is then released from its sac and mixes with the surrounding white. When this happens the very purpose of the egg separator is defeated.

An important object of the present invention is the provision of an egg separator which will allow the white to be separated from the yolk quickly, cleanly, and without fear of puncturing or shearing the yolk sac, regardless of the size of the yolk.

A further important object is the provision of an egg separator which, by its unique arrangement of structure, will insure that the yolk sac will not be punctured during the egg separation operation. To this end, one of the features of the present invention resides in the manner in which the yolk handling member is moved relative to the remaining structure to insure against puncturing the yolk sac during the egg separating operation. Another object of the present invention is the provision of a device which will enable one to carry out the complete egg separation operation, from the cracking and separating of the egg shell to the separation of the white from the yolk. To effect the complete operation, an important feature of the invention resides in a novel egg shell cracking and separating means which will enable one to crack and separate an egg shell without injuring the yolk sac.

The invention incorporates still further novel features such as a means for positively seating and positioning the egg separating device on a receptacle, and an egg guiding structure which will smoothly guide and convey the white and yolk from the cracked, separated shell to a yolk handling means in which separation is effected.

Other objects of the invention will be pointed out in the following description and claims and illustrated in the accompanying drawings, which disclose, by way of example, the principle of the invention and the best mode, which has been contemplated, of applying that principle.

Figure 4:
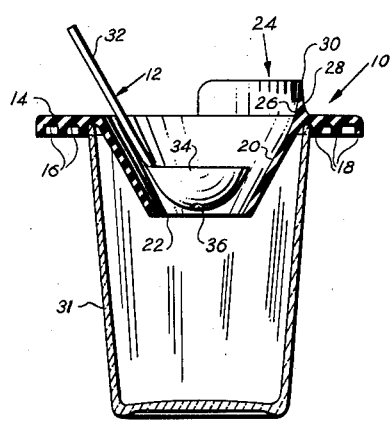
Figure 2:
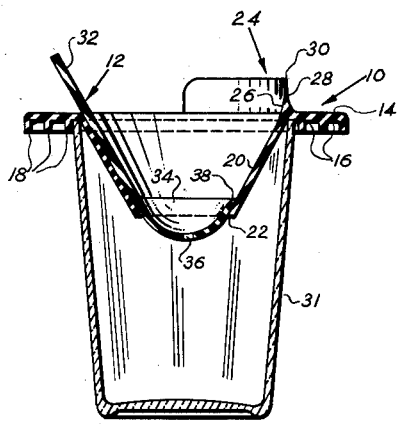
Figure 3:
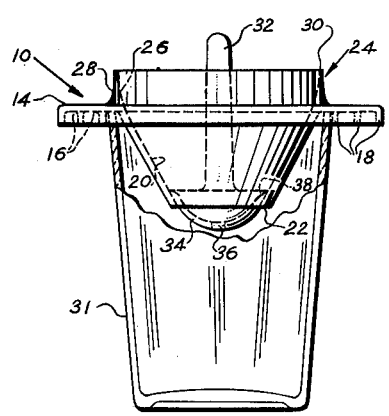

In the drawings:

Fig. 1 is a top view of an egg separator constructed in accordance with the principles of my invention, Fig. 2 is a sectional side view of the egg separator shown in Fig. 1 taken along section lines 2—2, Fig. 3 is a front view of the egg separator shown in Fig. 2 with parts of the elements broken away, Fig. 4 is a sectional side view similar to that shown in Fig. 2, with the yolk handling ladle lifted to the egg separating position.

Referring to the drawings, the egg separator consists of two independent elements, namely, a base generally identified by the numeral 10 and a ladle generally identified by the numeral 12. To provide an unbreakable construction both the base and ladle 12 may be made of a combination of acetone and polystyrene or other unbreakable material. Base 10 has a lateral extension 14 on the underside of which are a plurality of annularly spaced seats 16. Extending downward from the lateral portion 14 are a plurality of annularly spaced receptacle locating ridges 18.

A frusto-conical guide surface 20 depends from the portion 14 to form a guide for the contents of an egg in the manner to be described. The opening 22 at the lower, narrow end of the cone 20 constitutes an outlet while the larger end, at which the cone merges with the portion 14, may be described as the inlet (not numbered).

At the top of the lateral extension 14 there is provided a novel egg separating element, generally identified by the numeral 24. The element 24 is arcuate in shape and extends about a substantial arcuate portion of the lateral extension 14. It is formed by two tapered sides 26 and 28 which merge to provide a cutting edge 30. Cutting edge 30 is adapted to crack, sever and separate an egg shell without puncturing or tearing the yolk sac. As the description proceeds, this function will become clearer. Referring to Figs. 2, 3 and 4 of the drawing it will be seen that the tapered side 26 merges with the conical guide surface 20 while the tapered side 28 merges smoothly with the lateral extension 14. Side 28 merges with extension 14 in such a manner that there are no sharp, inaccessible corners. In a construction of this kind cleaning access is afforded to those areas where egg wastes are more likely to be deposited and accumulated.

In use, the base 10 is placed over the neck opening of any desired receptacle, such as the one identified by the numeral 31. The conical surface 20 will extend downwardly into the receptacle and will be centered therein by the centering locating ridges 18 which will abut the outer periphery of the receptacle neck. At the same time the base 10 will be firmly seated on the neck of the receptacle 31 because of the recessed seats 16. Inasmuch as the instant invention may be used with receptacles of varying neck sizes, seating spaces 16 between the ridges 18 may be varied to accommodate a range of neck diameters of commonly used receptacles.

The ladle or yolk handling means 12, being an independent element, has a handle 32 and a spoon means or element 34. At the lowest portion of the spoon 34 there is provided an outlet 36, the purpose of which will be described later. In Figs. 2 and 3 the surface contour of the spoon 34 may be seen more clearly. The outer surface of the spoon 34 is tapered near its upper edge and at its lower portion it is substantially semispherical in shape. The outer tapered sides (not numbered) of the spoon are formed with the same angular divergence as is the inner guide surface 20.

When the ladle 12 is placed in the base 10, the spoon 34 seats concentrically in the outlet 22; the concentric seating being insured by the ladle handle 32 seating flatly against the surface 20. Thus, when the spoon 34 is seated concentrically in the outlet 22, the outer tapered sides of the spoon mate and converge with the surface 20. The smoothly curved surface 38, provided on the spoon 34, will then mate with the guide surface 20 to cooperate therewith to form a continuation of the guide surface 20.

To use the instant device, base 10 is positioned over the neck of a receptacle 31 with the conical guide surface 20 extending therein. Base 10 is centered on the receptacle neck by one of the positioning ridges 18 and firmly seated thereon by one of the seats 16. Ladle 12 is lowered into the base so that the spoon 34 seats concentrically in the outlet 22 in the manner previously described (see Figs. 2 and 3).

An egg whose contents is to be separated is grasped in one hand in a manner so that two fingers of the hand are held spaced apart. The egg is then brought down firmly, but with moderate force, against the edge 30; the edge passing between the spaced fingers. When the egg hits the edge 30 it will be cracked thereby. If the downward movement continues, the shell will be severed by the diverging sides 26 and 28 until the shell is separated completely. Naturally, if a greater portion of the egg extends over the cavity formed by the conical surface 20 when the shell is separated, the contents will fall into the cavity. As mentioned previously, the egg shell cracking edge 30 will not puncture or tear the yolk sac because the fingers of the hand in which the egg is grasped limit the extent to which the edge 30 will enter the egg. This is assured by predeterminately limiting the height of the edge 30 so that when the fingers of the hand reach and come in contact with the extension 14 the edge 30 will have entered the egg a distance sufficient only to accomplish its intended function.

As the contents drops from the separated egg shell it is guided and conveyed from the surface 26 to surface 20 and then smoothly guided over the guide surface 38. Any white which is underneath the yolk in the spoon 34 will drop into the receptacle 31 by way of outlet 36. To separate the remaining white from about the yolk, the ladle 12 is lifted upwardly between the sides of surface 20 (Fig. 4). Lifting of the ladle 12 permits the remaining egg white to fall and cascade down into the receptacle 31, guided by the conical guide surface 20.

However, if for any reason it is desired to halt the separation operation, the spoon 34 is merely lowered again into the conical surface 20 to cover the outlet 22. In so doing, if the yolk seated in the spoon 34 should be larger than is ordinarily accommodated thereby, so that it hangs over the edge of the spoon, the downward movement of the spoon relative to the surface 20 will lift and move the overhanging yolk toward the center of the spoon so as to prevent pinching or puncturing the yolk sac between the spoon and the surface 20.

From the above it will be seen that the instant invention enables one to perform the egg separating operation starting from the cracking of the egg to separating the white from the yolk without fear of intermixing the white and the yolk.

While there have been shown and described and pointed out the fundamental novel features of the invention as applied to a preferred embodiment thereof, it will be understood that various omissions and substitutions and changes in the form and details of the device illustrated and its operation may be made by those skilled in the art, without departing from the spirit of the invention. It is the intention, therefore, to be limited only as indicated by the scope of the claims appended hereto.

The invention is claimed as follows:

1. A separator for eggs comprising a frusto-conical guide member having an annular supporting flange extending outwardly from the larger end portion, egg cracking means extending from said flange in a direction away from the smaller end of said guide member, a manually removable yolk-holding spoon in said guide member, of a size greater than that of the small end of said frusto-conical member, and handle means on said spoon.

2. A separator for eggs comprising a frusto-conical guide member having an annular supporting flange extending outwardly therefrom to support the same on receptacles of varying sizes, egg cracking means extending from said flange in a direction away from the smaller end of said guide member, a manually movable yolk handling spoon in said guide member of a size greater than that of the smaller end of said frusto-conical member, said spoon having outlet means to separate the egg white from beneath the yolk, and handle means on said spoon to manually remove the same from said guide member.

3. In an egg separator device, a base member having means to locate and positively seat said device on a desired receptacle, guide means on said base including means extending downwardly from said base, outlet means defined in said downwardly extending means, yolk-handling spoon means being operable within said guide means and cooperable therewith over said outlet, and arcuate egg shell separating means on said base extending upwardly therefrom along a portion thereof, said separating means including a shell cracking edge to crack the egg shell and tapered means to sever and separate said cracked shell, said tapered means of said egg shell separating means including surface means cooperating with said guide means to form therewith an uninterrupted guide path for the contents of an egg whose shell has been cracked on said sharp edge and severed and separated by said tapered means.

References Cited in the file of this patent

UNITED STATES PATENTS

| 1,759,512 | Kramer et al. | May 20, 1930 |
| 1,840,658 | Dammrich | Jan. 12, 1932 |
| 2,117,899 | Meckler | May 17, 1938 |

FOREIGN PATENTS

| 594,041 | Great Britain | Oct. 31, 1947 |